(12) United States Patent
Jain et al.

(10) Patent No.: US 9,036,822 B1
(45) Date of Patent: May 19, 2015

(54) METHODS FOR MANAGING USER INFORMATION AND DEVICES THEREOF

(75) Inventors: Amit Jain, San Jose, CA (US); Dennis Zhou, Fremont, CA (US); John Robert Hughes, Seattle, WA (US)

(73) Assignee: F5 Networks, Inc., Seattle, WA (US)

(*) Notice: Subject to any disclaimer, the term of this patent is extended or adjusted under 35 U.S.C. 154(b) by 0 days.

(21) Appl. No.: 13/397,290

(22) Filed: Feb. 15, 2012

(51) Int. Cl.
*H04L 29/06* (2006.01)
*G06F 21/00* (2013.01)
*H04L 9/14* (2006.01)
*H04L 9/08* (2006.01)

(52) U.S. Cl.
CPC .............. *H04L 9/14* (2013.01); *H04L 9/0894* (2013.01)

(58) Field of Classification Search
CPC ........... H04L 9/14; H04L 9/0894; H04L 9/00; H04L 9/0816
See application file for complete search history.

(56) References Cited

U.S. PATENT DOCUMENTS

| | | | |
|---|---|---|---|
| 5,388,237 A | 2/1995 | Sodos |
| 5,742,765 A | 4/1998 | Wong et al. |
| 5,761,534 A | 6/1998 | Lundberg et al. |
| 5,797,033 A | 8/1998 | Ecclesine |
| 5,828,835 A | 10/1998 | Isfeld et al. |
| 5,941,988 A | 8/1999 | Bhagwat et al. |
| 6,026,443 A | 2/2000 | Oskouy et al. |
| 6,115,802 A | 9/2000 | Tock et al. |
| 6,529,508 B1 | 3/2003 | Li et al. |
| 6,700,871 B1 | 3/2004 | Harper et al. |
| 6,748,457 B2 | 6/2004 | Fallon et al. |
| 6,781,990 B1 | 8/2004 | Puri et al. |
| 6,820,133 B1 | 11/2004 | Grove et al. |
| 6,947,985 B2 | 9/2005 | Hegli et al. |
| 6,959,394 B1 | 10/2005 | Brickell et al. |
| 7,065,630 B1 | 6/2006 | Ledebohm et al. |
| 7,107,348 B2 | 9/2006 | Shimada et al. |
| 7,117,308 B1 | 10/2006 | Mitten et al. |
| 7,142,540 B2 | 11/2006 | Hendel et al. |
| 7,236,491 B2 | 6/2007 | Tsao et al. |
| 7,281,030 B1 | 10/2007 | Davis |
| 7,324,525 B2 | 1/2008 | Fuhs et al. |

(Continued)

FOREIGN PATENT DOCUMENTS

EP 1813084 A1 8/2007
WO WO 2006/055494 A1 5/2006

OTHER PUBLICATIONS

Cavium Networks, "Cavium Networks Product Selector Guide—Single & Multi-Core MIPS Processors, Security Processors and Accelerator Boards," 2008, pp. 1-44, Mountain View, CA, US.

(Continued)

*Primary Examiner* — Izunna Okeke
(74) *Attorney, Agent, or Firm* — LeClairRyan, a Professional Corporation

(57) ABSTRACT

A method, non-transitory computer readable medium and application manager computing device comprises obtaining at least one cryptographic key from a request by a client computing device for a user session. User information corresponding to a user is encrypted or decrypted using the cryptographic key. The request is authenticated based on encryption or decryption of the user information. The cryptographic key is deleted after the completion or termination of the user session.

21 Claims, 3 Drawing Sheets

(56) References Cited

U.S. PATENT DOCUMENTS

| | | | |
|---|---|---|---|
| 7,355,977 | B1 | 4/2008 | Li |
| 7,376,772 | B2 | 5/2008 | Fallon |
| 7,403,542 | B1 | 7/2008 | Thompson |
| 7,420,931 | B2 | 9/2008 | Nanda et al. |
| 7,478,186 | B1 | 1/2009 | Onufryk et al. |
| 7,496,695 | B2 | 2/2009 | Go et al. |
| 7,500,028 | B2 | 3/2009 | Yamagishi |
| 7,512,721 | B1 | 3/2009 | Olson |
| 7,516,492 | B1 | 4/2009 | Nisbet et al. |
| 7,533,197 | B2 | 5/2009 | Leonard et al. |
| 7,558,910 | B2 | 7/2009 | Alverson et al. |
| 7,571,299 | B2 | 8/2009 | Loeb |
| 7,647,416 | B2 | 1/2010 | Chiang et al. |
| 7,657,659 | B1 | 2/2010 | Lambeth et al. |
| 7,668,727 | B2 | 2/2010 | Mitchell et al. |
| 7,668,851 | B2 | 2/2010 | Triplett |
| 7,729,239 | B1 | 6/2010 | Aronov et al. |
| 7,734,809 | B2 | 6/2010 | Joshi et al. |
| 7,735,099 | B1 | 6/2010 | Micalizzi, Jr. |
| 7,742,412 | B1 | 6/2010 | Medina |
| 7,784,093 | B2 | 8/2010 | Deng et al. |
| 7,826,487 | B1 | 11/2010 | Mukerji et al. |
| 7,877,524 | B1 | 1/2011 | Annem et al. |
| 7,916,728 | B1 | 3/2011 | Mimms |
| 8,006,016 | B2 | 8/2011 | Muller et al. |
| 8,103,809 | B1 | 1/2012 | Michels et al. |
| 8,112,491 | B1 | 2/2012 | Michels et al. |
| 8,112,594 | B2 | 2/2012 | Giacomoni et al. |
| 8,279,865 | B2 | 10/2012 | Giacomoni et al. |
| 8,302,169 | B1* | 10/2012 | Presotto et al. ............ 726/5 |
| 2003/0067930 | A1 | 4/2003 | Salapura et al. |
| 2003/0204636 | A1 | 10/2003 | Greenblat et al. |
| 2004/0202161 | A1 | 10/2004 | Stachura et al. |
| 2004/0249948 | A1 | 12/2004 | Sethi et al. |
| 2004/0267897 | A1 | 12/2004 | Hill et al. |
| 2005/0007991 | A1 | 1/2005 | Ton et al. |
| 2005/0083952 | A1 | 4/2005 | Swain |
| 2005/0114559 | A1 | 5/2005 | Miller |
| 2005/0175014 | A1 | 8/2005 | Patrick |
| 2006/0007928 | A1 | 1/2006 | Sangillo |
| 2006/0104303 | A1 | 5/2006 | Makineni et al. |
| 2006/0221832 | A1 | 10/2006 | Muller et al. |
| 2006/0221835 | A1 | 10/2006 | Sweeney |
| 2006/0235996 | A1 | 10/2006 | Wolde et al. |
| 2006/0288128 | A1 | 12/2006 | Moskalev et al. |
| 2008/0101596 | A1* | 5/2008 | Cerruti et al. ............ 380/30 |
| 2008/0126509 | A1 | 5/2008 | Subramanian et al. |
| 2008/0184248 | A1 | 7/2008 | Barua et al. |
| 2009/0003204 | A1 | 1/2009 | Okholm et al. |
| 2009/0016217 | A1 | 1/2009 | Kashyap |
| 2009/0089619 | A1 | 4/2009 | Huang et al. |
| 2009/0222598 | A1 | 9/2009 | Hayden |
| 2009/0248911 | A1 | 10/2009 | Conroy et al. |
| 2010/0017846 | A1 | 1/2010 | Huang et al. |
| 2010/0082849 | A1 | 4/2010 | Millet et al. |
| 2010/0094945 | A1 | 4/2010 | Chan et al. |
| 2012/0101952 | A1 | 4/2012 | Raleigh et al. |
| 2012/0191800 | A1 | 7/2012 | Michels et al. |
| 2012/0317266 | A1 | 12/2012 | Abbott |
| 2014/0032695 | A1 | 1/2014 | Michels et al. |
| 2014/0095661 | A1 | 4/2014 | Knowles et al. |

OTHER PUBLICATIONS

"Chapter 15, Memory Mapping and DMA," Memory Management in Linux, ch15.13676, accessed on Jan. 25, 2005, pp. 412-463.

Comtech AHA Corporation, "Comtech AHA Announces 3.0 Gbps GZIP Compression/Decompression Accelerator AHA362-PCIX offers high-speed GZIP compression and decompression," www.aha.com, Apr. 20, 2005, pp. 1-2, Moscow, ID, USA.

Comtech AHA Corporation, "Comtech AHA Announces GZIP Compression and Decompression IC Offers the highest speed and compression ratio performance in hardware on the market," www.aha.com, Jun. 26, 2007, pp. 1-2, Moscow, ID, USA.

Eventhelix, "DMA and Interrupt Handling," <http://www.eventhelix.com/RealtimeMantra/FaultHandling/dma_interrupt_handling.htm>, Jan. 29, 2010, pp. 1-4, EventHelix.com.

Alteon Websystems Inc., "Gigabit Ethernet/PCI Network Interface Card; Host/NIC Software Interface Definition," Jul. 1999, pp. 1-80, Revision 12.4.13, P/N 020001, San Jose, California.

Harvey et al., "DMA Fundamentals on Various PC Platforms," Application Note 011, Apr. 1999, pp. 1-20, National Instruments Corporation.

Bell Laboratories, Lucent Technologies, "Layer 4/7 Switching and Other Custom IP Traffic Processing using the NEPPI API," Bell Laboratories, Lucent Technologies, pp. 1-11, Murray Hill, NJ.

Mangino, John, "Using DMA with High Performance Peripherals to Maximize System Performance," WW TMS470 Catalog Applications, SPNA105 Jan. 2007, pp. 1-23.

Mogul, Jeffrey C., "The Case for Persistent-Connection HTTP," SIGCOMM '95, Digital Equipment Corporation Western Research Laboratory, 1995, pp. 1-15, Cambridge, Maine.

Cavium Networks, "NITROX™ XL Security Acceleration Modules PCI 3V or 3V/5V-Universal Boards for SSL and IPSec," at http://www.Caviumnetworks.com, 2002, pp. 1, Mountain View, CA USA.

Cavium Networks, "PCI, PCI-X," at (http://www.cavium.com/acceleration_boards_PCI_PCI-X.htm (Downloaded Oct. 2008), Cavium Networks—Products > Acceleration Boards > PCI, PCI-X).

"Plan 9 kernel history: overview / file list / diff list," <http://switch.com/cgi-bin/plan9history.cgi?f=2001/0126/pc/etherga620.com>, accessed Oct. 22, 2007, pp. 1-16.

Rabinovich et al., "DHTTP: An Efficient and Cache-Friendly Transfer Protocol for the Web," IEEE/ACM Transactions on Networking, Dec. 2004, pp. 1007-1020, vol. 12, No. 6.

Salchow, Jr., KJ, "Clustered Multiprocessing: Changing the Rules of the Performance Game," F5 White Paper, Jan. 2008, pp. 1-11, F5 Networks, Inc.

Stevens, W., "TCP Slow Start, Congestion Avoidance, Fast Retransmit, and Fast Recovery Algorithms," Network Working Group, RFC 2001, Jan. 1997, pp. 1-6.

Eventhelix, "TCP-Transmission Control Protocol (TCP Fast Retransmit and Recovery)," Mar. 28, 2002, pp. 1-5, EventHelix.com.

Wadge, Wallace, "Achieving Gigabit Performance on Programmable Ethernet Network Interface Cards," May 29, 2001, pp. 1-9.

Welch, Von, "A User's Guide to TCP Windows," http://www.vonwelch.com/report/tcp_windows, updated 1996, last accessed Jan. 29, 2010, pp. 1-5.

Wikipedia, "Direct memory access," <http://en.wikipedia.org/wiki/Direct_memory_access>, accessed Jan. 29, 2010, pp. 1-6.

Wikipedia, "Nagle's algorithm," <http://en.wikipedia.org/wiki/Nagle%27s_algorithm>, 2 pages.

* cited by examiner

METHODS FOR MANAGING USER INFORMATION AND DEVICES THEREOF

TECHNICAL FIELD

This technology generally relates to managing user information and, more particularly, to methods for securing user information using a unique per-client one-time use cryptographic key for securing client's information thereof.

BACKGROUND

Client information generally relates to confidential information of clients such as user name, passwords, bank account details, client cookies etc. This confidential information is often stored in a server of the service provider and the service provider needs to ensure that confidential information of the clients/customers are not stolen or misused. Accordingly, there is a need to protect this confidential information.

In the existing solutions, there is an encryption/decryption key stored at the server which is used to encrypt/decrypt the client information securely. Since this is already present in the server, it would not provide the best security as a third party can hack or steal the encryption/decryption key and then has access to all the confidential information. Also, when the access to the server is compromised or if the server memory is dumped as part of process cores, secure information pertaining to various clients/customers might also be retrieved.

SUMMARY

A method for managing user information comprises obtaining by the application manager computing device at least one cryptographic key from a request by a client computing device. The application manager computing device encrypts or decrypts user information corresponding to a user using the cryptographic key. The application manager computing device authenticates the request based on the encryption or decryption of the user information. The cryptographic key is deleted by the application manager computing device after the completion of the user session.

A non-transitory computer readable medium having stored thereon instructions for managing user information comprising machine executable code which when executed by at least one processor, causes the processor to perform steps comprising obtaining at least one cryptographic key from a request by a client computing device for a user session. User information corresponding to a user is encrypted or decrypted using the cryptographic key. The request is authenticated based on encryption or decryption of the user information. The cryptographic key is deleted after the completion or termination of the user session.

An application manager computing device including one or more processors, a memory coupled to the one or more processors, and a configurable logic unit coupled to the one or more processors and the memory via at least one bus, at least one of the configurable logic unit configured to implement and the one or more processors configured to execute programmed instructions stored in the memory includes obtaining at least one cryptographic key from a request sent by a client computing device. User information corresponding to a user is encrypted or decrypted using the at least one cryptographic key. The request is authenticated based on encryption or decryption. The at least one cryptographic key is deleted after the completion or termination of a new user session.

This technology provides a number of advantages including providing more effective methods, non-transitory computer readable medium and devices for securing user information. This exemplary technology makes managing user information more secure by storing the cryptographic key used for encrypting user's sensitive information in a location that is different from the location of the encrypted user's sensitive information itself.

DETAILED DESCRIPTION

Figure 1:
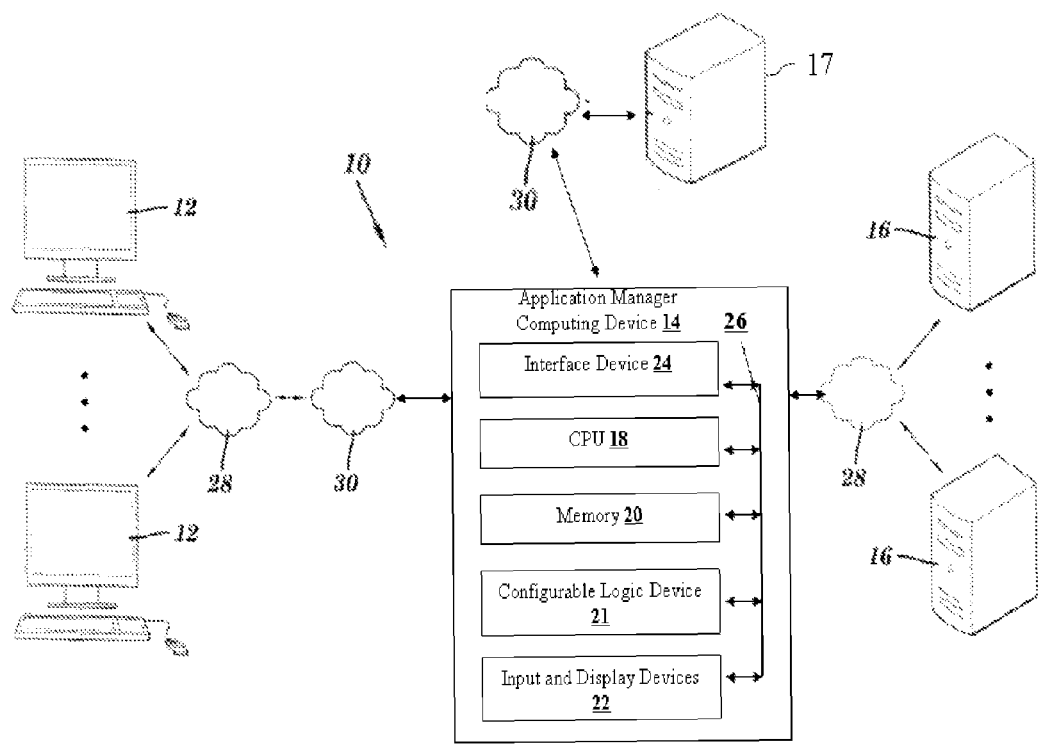
FIG. 1 is a block diagram of an exemplary network environment with an application manager computing device for managing user information.

An exemplary network environment 10 with an application manager computing device 14 for managing user information to a service is illustrated in FIG. 1. The exemplary environment 10 includes client computing devices 12, the application manager computing device 14, servers 16 and user information server 17 which are coupled together by local area networks (LANs) 28 and wide area network (WAN) 30, although the environment can include other types and numbers of devices, components, elements and communication networks in other topologies and deployments. While not shown, the exemplary environment 10 may include additional network components, such as routers, switches and other devices, which are well known to those of ordinary skill in the art and thus will not be described here. This technology provides a number of advantages including providing more effective methods, non-transitory computer readable medium and devices for securing user information.

Referring more specifically to FIG. 1, application manager computing device 14 is coupled to client computing devices 12 through one of the LANs 28 and WAN 30, although the client computing devices 12 and application manager computing device 14 may be coupled together via other topologies. Additionally, the application manager computing device 14 is coupled to the servers 16 through the WAN 30 and another one of the LANs 28, although the servers 16 and application manager computing device 14 may be coupled together via other topologies. The application manager computing device 14 also is coupled to the user information server 17 through the WAN 30, although the application manager computing device 14 and the user information server 17 may be coupled together via other topologies.

The application manager computing device 14 assists with managing user information as illustrated and described with the examples herein, although application manager computing device 14 may perform other types and numbers of functions. The application manager computing device 14 includes at least one processor 18, memory 20, optional configurable logic device 21, input and display devices 22, and interface device 24 which are coupled together by bus 26, although application manager computing device 14 may comprise other types and numbers of elements in other configurations.

Processor(s) 18 may execute one or more computer-executable instructions stored in the memory 20 for the methods illustrated and described with reference to the examples herein, although the processor(s) can execute other types and numbers of instructions and perform other types and numbers of operations. The processor(s) 18 may comprise one or more central processing units ("CPUs") or general purpose processors with one or more processing cores, such as AMD® processor(s), although other types of processor(s) could be used (e.g., Intel®).

Figure 2A:
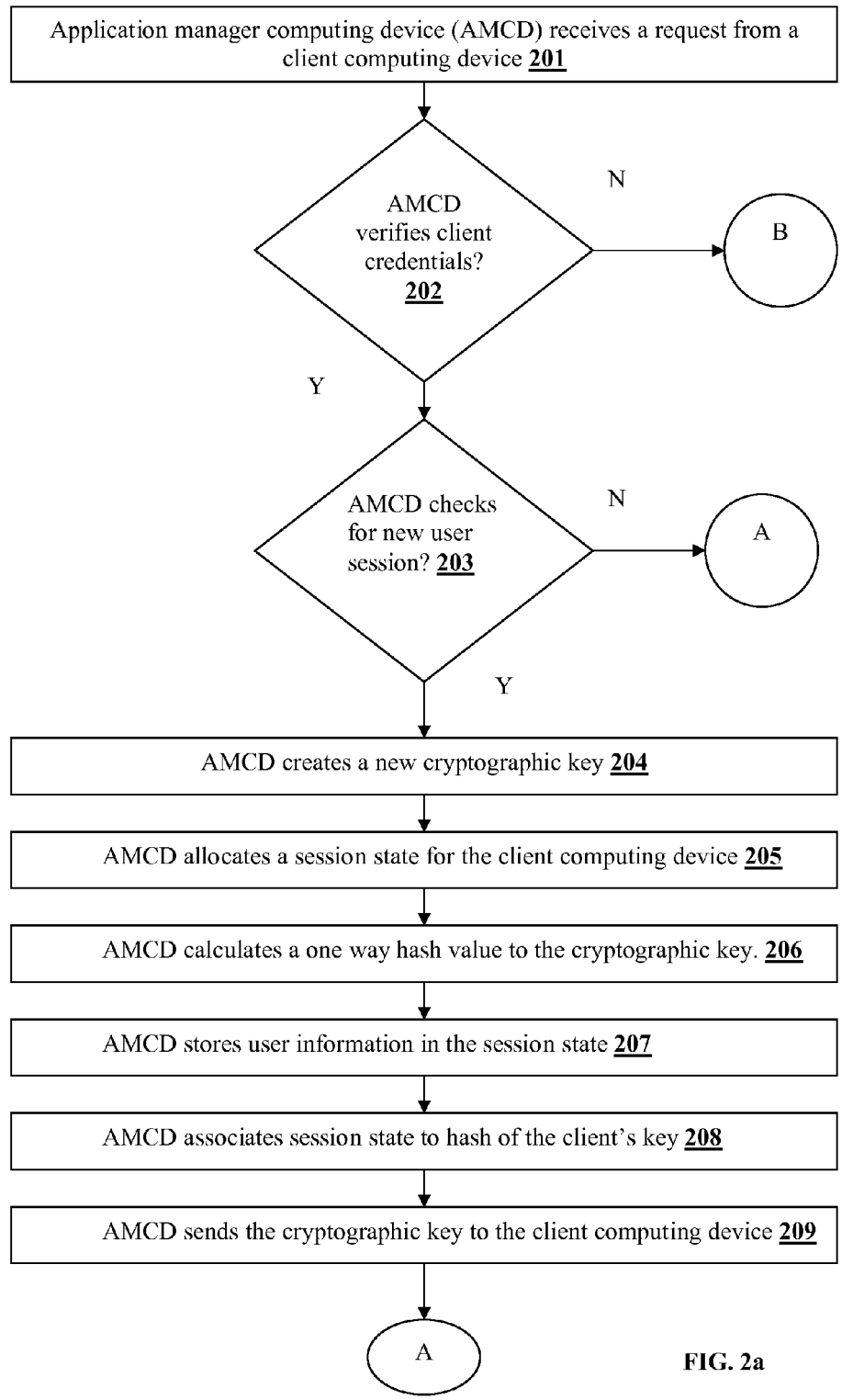
FIGS. 2a-2b are flowcharts of an exemplary method for managing user information.
Figure 2B:
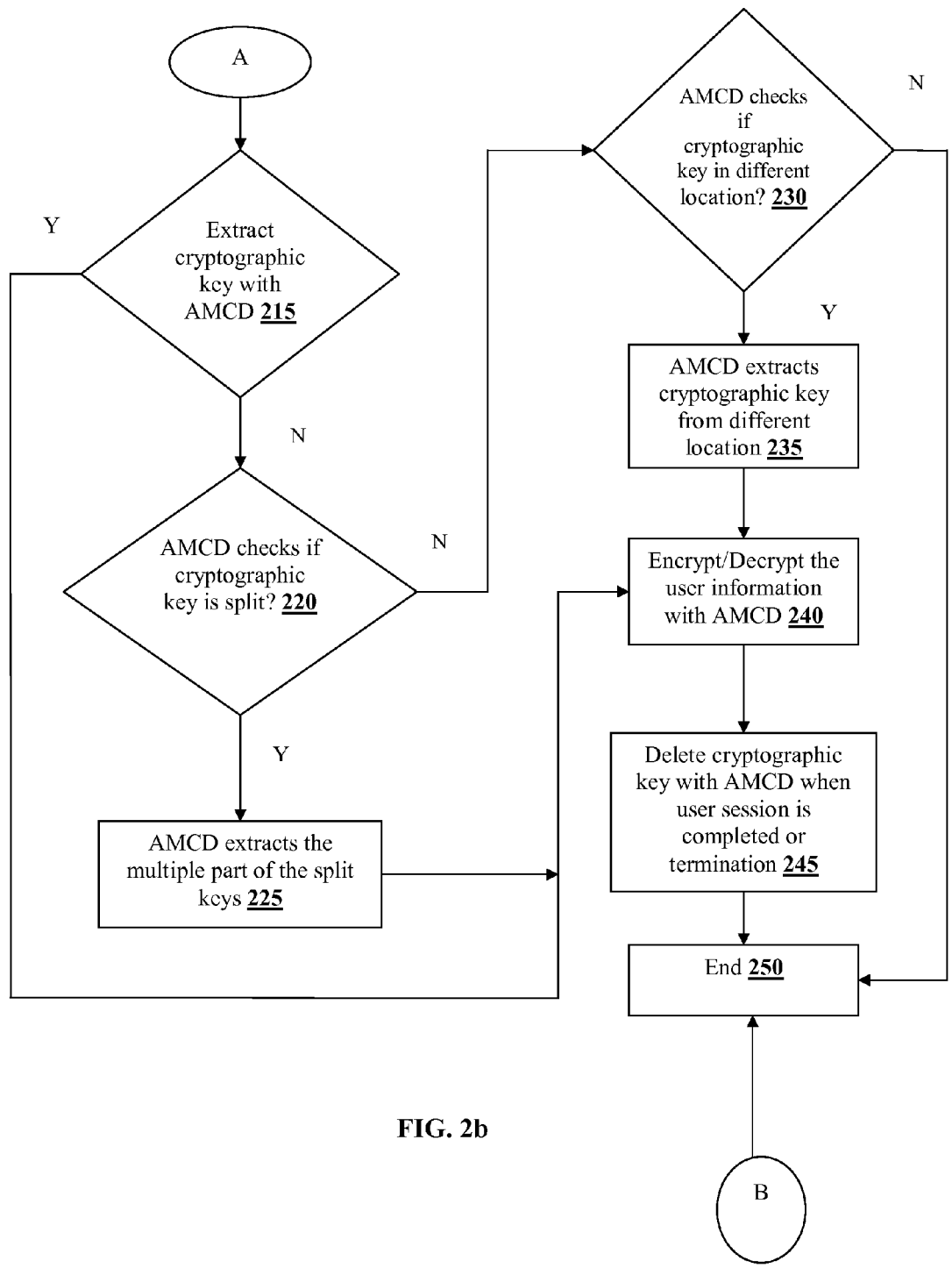

Memory 20 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. Memory 20 may store one or more non-transitory computer-readable instructions of this technology as illustrated and described with reference to the examples herein that may be executed by the one or more processor(s) 18. The flow chart shown in FIG. 2a and FIG. 2b is representative of example steps or actions of this technology that may be embodied or expressed as one or more non-transitory computer or machine readable instructions stored in memory 20 that may be executed by the processor(s) 18 and/or may be implemented by configured logic in the optional configurable logic device 21.

The configurable logic device 21 may comprise specialized hardware configured to implement one or more steps of this technology as illustrated and described with reference to the examples herein. By way of example only, the optional configurable logic device 21 may comprise one or more of field programmable gate arrays ("FPGAs"), field programmable logic devices ("FPLDs"), application specific integrated circuits ("ASICs") and/or programmable logic units ("PLUs").

Input and display devices 22 enable a user, such as an administrator, to interact with the application manager computing device 14, such as to input and/or view data and/or to configure, program and/or operate it by way of example only. Input devices may include a keyboard and/or a computer mouse and display devices may include a computer monitor, although other types and numbers of input devices and display devices could be used.

The interface device 24 in the application manager computing device 14 is used to operatively couple and communicate between the application manager computing device 14 and the client computing devices 12 and the servers 16 which are all coupled together by one or more of the local area networks (LAN) 28 and/or the wide area network (WAN) 30, although other types and numbers of communication networks or systems with other types and numbers of connections and configurations to other devices and elements. By way of example only, the local area networks (LAN) 28 and the wide area network (WAN) 30 can use TCP/IP over Ethernet and industry-standard protocols, including NFS, CIFS, SOAP, XML, LDAP, and SNMP, although other types and numbers of communication networks, can be used. In this example, the bus 26 is a hyper-transport bus in this example, although other bus types and links may be used, such as PCI.

Each of the client computing devices 12, servers 16 and the user information server 17 include a central processing unit (CPU) or processor, a memory, an interface device, and an I/O system, which are coupled together by a bus or other link, although other numbers and types of network devices could be used. The client computing devices 12, in this example, may run interface applications, such as Web browsers, that may provide an interface to make requests for and send content and/or data to different server based applications at servers 16 via the LANs 28 and/or WANs 30. Additionally, in order for the client computing devices 12 to requests for content to one or more of the servers 16, each client computing device 12 may have to provide one or more user credential information for authentication.

Generally, servers 16 process requests received from requesting client computing devices 12 via LANs 28 and/or WANs 30 according to the HTTP-based application RFC protocol or the CIFS or NFS protocol in this example, but the principles discussed herein are not limited to this example and can include other application protocols. A series of applications may run on the servers 16 that allow the transmission of data, such as a data file or metadata, requested by the client computing devices 12. The servers 16 may provide data or receive data in response to requests directed toward the respective applications on the servers 16 from the client computing devices 12. It is to be understood that the servers 16 may be hardware or software or may represent a system with multiple servers 16, which may include internal or external networks. In this example the servers 16 may be any version of Microsoft® IIS servers or Apache® servers, although other types of servers may be used. Further, additional servers may be coupled to the LAN 28 and many different types of applications may be available on servers coupled to the LAN 28.

In this example, the exemplary environment 10 includes user information server 17. The user information server 17 receives the request from the application manager computing device 14 via WAN 30 according to the HTTP-based application RFC protocol or the CIFS or NFS protocol in this example, but the principles discussed herein are not limited to this example and can include other application protocols. One or more user related information such as user name, password may reside in the user information server 17, although other types of user related information may also be present in the user information server 17. The user information server 17 may provide data in the form of encrypted/decrypted user information corresponding to a user in response to requests directed toward the user information server 17, although other types of information may also be provided. It is to be understood that the user information server 17 may be hardware or software.

Although an exemplary network environment 10 with the client computing devices 12, the application manager computing device 14, servers 16, the LANs 28 and the WAN 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Additionally, in this example, a user session is established between the application manager computing device 14 and the requesting client computing device 12 through one or more of LANs 28 and/or WANs 30. The session may be a semi-permanent interactive information exchange between the application manager computing device 14 and the client computing devices 12 which has sent the request for authentication. The user session may be established at a certain point of time and may also be terminated at a later point of time. An established communication session may involve more than one message exchanged between the application manager computing device 14 and the client computing devices 12. Further, the session may also be a stateless communication wherein an independent request may be received only once by the application manager computing device 14 and the application manager computing device 14 may need to respond only once.

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An exemplary method for managing user information to a service will now be described with reference to FIGS. 1, 2a-2b. In step 201, the application manager computing device 14 receives a request from a client computing device 14, although the application manager computing device 14 may receive additional information such as client/user credentials from the client computing device 12.

In step 202, the application manager computing device 14 verifies and validates the client credentials from the requesting one of the client computing devices 12 using session validation logic, although other types of session validation algorithms may also be used. The validation of the session identification information is performed only when the new user session has been created by the application manager computing device 14. If in step 202 the session identification information is not verified, then the No branch is taken to step 250 where this exemplary process ends. If in step 210 the session identification information is verified, then the Yes branch is taken to step 203.

In step 203, the application manager computing device 14 checks if the requested is associated with a new user session or an already existing session based on the a session identification information and/or a cryptographic key. If the application manager computing device 14 determines that it is a new user session, a Yes branch is taken to step 204, else a No branch is taken to step 215.

In step 204, the application manager computing device 14 creates a new user session with session identification information and a new at least one cryptographic key. In another exemplary method, the new at least one cryptographic key or an attribute of the cryptographic key can be used as a session identification information.

In step 205, the application manager computing device 14 a new session state for the requesting client computing device 12 is allocated.

In step 206, the application manager computing device 14 calculates a one-way hash value of the cryptographic key, although other types of functions can be calculated. The hash value can be used by the application manager computing device 14 to identify the session state allocated on the application manager computing device.

In step 207, the application manager computing device 14 stores the user information along with the cryptographic key in the newly created session state for the client computing device 12, although the user information and the cryptographic key can also be stored in the memory 20 of the application manager computing device 14.

In step 208, the application manager computing device 14 associates the session state with the one-way hash value of the cryptographic key, this association is used by application manager computing device to select the session state whenever it needs to access the client's information pertaining to a client. Based on the cryptographic key retrieved from the client, application manager computing device can retrieve the associated session state, although other types and numbers of states and other values can be associated.

In step 209, the application manager computing device 14 transmits the cryptographic key and the session identification information back to the requesting one of the client computing devices 12 for storage, although parts or the entire cryptographic key could be stored in other manners. By way of example, the cryptographic key may be split by the application manager computing device 14 and at least one part of the cryptographic key may be stored in the memory of the requesting one of the client computing devices 12 and the other parts may be stored at other locations. The application manager computing device 14 keeps track of the cryptographic key stored at different locations by storing the location information in the session state. An appropriate session state is used to store the keys location information by selecting a session state based on the hash of the cryptographic key.

Further, in another example the application manager computing device 14 may store the cryptographic key in a different location and may send the address of the location to the requesting one of the client computing devices 12. Further, the session identification information and/or the cryptographic key may be stored in the requesting one of the client computing devices 12 as a cookie. The cryptographic key created by the application manager computing device 14 is used to securely encrypt user sensitive information such as user name, password etc.

With reference to FIG. 2b, in step 215, the application manager computing device 14 determines if the cryptographic key is present in the request sent by the client computing device 12. If in step 215 the application manager computing device 14 determines that the entire cryptographic key is present in the request sent by the client computing device 12, it extracts the cryptographic key and takes the Yes branch to step 240. Further, the application manager computing device 14 on extracting, caches the cryptographic key for processing the subsequent request, although the cryptographic key could be obtained and stored in other manners.

If in step 215 the application manager computing device 14 determines that the entire cryptographic key is not present in the request sent by the client computing device 12, the No branch is taken to step 220. In step 220, the application manager computing device 14 checks if the obtained cryptographic key was split into a plurality of parts with one part in the current request. If in step 220 the application manager computing device determines that the cryptographic key was split into a plurality of parts with one part in the current request, then the Yes branch is taken to step 225.

In step 225, the application manager computing device 14 retrieves the one part of the cryptographic key from the current request sent from the client computing device 12 and the other missing parts of the cryptographic key from one or more other locations by retrieving the list of locations from session state, although other manners for splitting and then retrieving the parts of the cryptographic key can be used. For example, the application manager computing device 14 may only retrieve a subset of the other missing parts from the one or more locations or could retrieve all of the missing parts from different locations. An appropriate session state is selected by using the hash of cryptographic key and proceeds to step 240.

If back in step 220 the application manager computing device determines that the cryptographic key was not split into a plurality of parts with one part in the current request, then the No branch is taken to step 230. In step 230, the application manager computing device 14 determines if the cryptographic key is stored in a different location. If in step 230, the application manager computing device 14 determines the cryptographic key is not stored in a different location, then the No branch is taken to step 250 to end the process.

If in step 230, the application manager computing device 14 determines the cryptographic key is stored in a different location, then the Yes branch is taken to step 235. In step 235, the application manager computing device 14 obtains the cryptographic key from the location based on the address retrieved from the request sent by the client computing device 12.

In step 240, the application manager computing device 14 obtains the user information from the user information server 17 based on the received request and decrypts or encrypts the user information present in the user information server 17 with the at least one unique cryptographic key. Additionally, the application manager computing device 14 may decrypt the user information corresponding to a user and authenticate a request sent to the server 16 on behalf of the client computing device 12. Further, the application manager computing device 14 after providing authentication may encrypt the user information in the user information server to store it securely.

Proceeding to step 245, the application manager computing device 14 deletes the cached cryptographic key after the request has been serviced or if the new user session has been terminated and the process ends at step 250.

In the above disclosed example, the secure storage of user/client information acts as a per-client secure vault which is only accessible of the client computing device 12 if it has passed the session identification information validation and has the cryptographic key. Additionally, for each new user session a new cryptographic key is generated making this per-client secure vault to be one-time use only. Further, a second cryptographic key may also be generated and stored by the application manager computing device 14 within the new user session. Accordingly, as illustrated and described with references to the examples herein, this technology makes managing user information both secure and efficient.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for managing user information, the method comprising:
   obtaining, by an application manager computing device, interposed between a client computing device and a server, at least one part of at least one cryptographic key comprising one or more parts, from a request by the client computing device for a user session, wherein a session state comprising location information for each of the one or more parts of the at least one cryptographic key is allocated during the user session;
   retrieving, by the application manager computing device, at least one other part of the at least one cryptographic key based on the location information when the at least one cryptographic key is incomplete;
   encrypting or decrypting, by the application manager computing device, user information with the at least one cryptographic key, wherein the same at least one cryptographic key is used between the application manager computing device and the client computing device during the user session;
   authenticating, by the application manager computing device, the request based on the encryption or decryption of the user information; and
   deleting, by the application manager computing device, the at least one cryptographic key only after completion of the user session.

2. The method as set forth in claim 1 further comprising:
   creating, by the application manager computing device, the at least one cryptographic key and session identification information for the user session;
   storing, by the application manager computing device, the at least one cryptographic key in the client computing device; and
   caching, by the application manager computing device, the at least one cryptographic key and the session identification information during the request processing until the completion of the user session.

3. The method as set forth in claim 2 wherein the storing further comprises:
   splitting by the application manager computing device the at least one cryptographic key into the one or more parts and storing at least one part in the client computing device.

4. The method as set forth in claim 2 wherein the creating further comprises:
   creating, by the application manager computing device, the at least one cryptographic key for securing user information during the user session.

5. The method as set forth in claim 1 further comprising:
   creating, by the application manager computing device, a second cryptographic key after a predetermined time period within the user session.

6. The method as set forth in claim 1 further comprising:
   obtaining by the application manager computing device, the at least one part of the at least one cryptographic key from the client computing device and other parts of the at least one cryptographic key from one or more other locations.

7. A non-transitory computer readable medium having stored thereon instructions for managing user information comprising machine executable code which when executed by at least one processor, causes the processor to perform steps comprising:
   obtaining at least one part of at least one cryptographic key comprising one or more parts, from a request by a client computing device for a user session, wherein a session state comprising location information for each of the one or more parts of the at least one cryptographic key is allocated during the user session;

retrieving at least one other part of the at least one cryptographic key based on the location information when the at least one cryptographic key is incomplete;

encrypting or decrypting user information, stored on a server, with the at least one cryptographic key, wherein the same at least one cryptographic key is used between an application manager computing device and the client computing device during the user session;

authenticating the request based on the encryption or decryption of the user information; and deleting the at least one cryptographic key only after completion of the user session.

8. The medium as set forth in claim 7 further having stored thereon instructions that when executed by the processor cause the processor to perform steps further comprising:

creating the at least one cryptographic key and session identification information for the user session;

storing the at least one cryptographic key at the client computing device; and caching the at least one cryptographic key and the session identification information during the request processing until the completion of the user session.

9. The medium as set forth in claim 8 further having stored thereon instructions for the storing that when executed by the processor cause the processor to perform steps further comprising:

splitting the at least one cryptographic key into the one or more parts and storing at least one part in the client computing device.

10. The medium as set forth in claim 8 further having stored thereon instructions for the creating that when executed by the processor cause the processor to perform steps further comprising:

creating the at least one cryptographic key for securing user information during the user session.

11. The medium as set forth in claim 7 further having stored thereon instructions that when executed by the processor cause the processor to perform steps further comprising:

creating a second cryptographic key after a predetermined time period within the user session.

12. The medium as set forth in claim 7 further having stored thereon instructions that when executed by the processor cause the processor to perform steps further comprising:

obtaining the at least one part of the at least one cryptographic key from the client computing device and other parts of the at least one cryptographic key from one or more other locations.

13. An application manager computing device to manage user information, the device comprising:

one or more processors;

configurable logic; and a memory, the configurable logic and the memory coupled to the one or more processors, at least one of the configurable logic configured to implement or the one or more processors configured to be capable of executing programmed instructions comprising and stored in the memory to:

obtain at least one part of at least one cryptographic key comprising one or more parts, from a request by a client computing device for a user session, wherein a session state comprising location information for each of the one or more parts of the at least one cryptographic key is allocated during the user session;

retrieve at least one other part of the at least one cryptographic key based on the location information when the at least one cryptographic key is incomplete;

encrypt or decrypting user information with the at least one cryptographic key, wherein the same at least one cryptographic key is used between the application manager computing device and the client computing device during the user session;

authenticate the request based on the encryption or decryption of the user information; and delete the at least one cryptographic key only after completion of the user session.

14. The device as set forth in claim 13 wherein the at least one of the configurable logic is further configured to implement or the one or more processors are further configured to be capable of executing programmed instructions comprising and stored in the memory to:

create the at least one cryptographic key and a session identification information for the user session;

store the at least one cryptographic key at the client computing device; and cache the at least one cryptographic key and the session identification information during the request processing until the completion of the user session.

15. The device as set forth in claim 14, wherein the at least one of the configurable logic is further configured to implement or the one or more processors are further configured to be capable of executing programmed instructions for the storing comprising and stored in the memory to:

split the at least one cryptographic key into the one or more parts and store at least one part in the client computing device.

16. The device as set forth in claim 13 wherein the at least one of the configurable logic is further configured to implement or the one or more processors are further configured to be capable of executing programmed instructions comprising and stored in the memory to:

create the at least one cryptographic key for securing user information during the user session.

17. The device as set forth in claim 13 wherein the at least one of the configurable logic is further configured to implement or the one or more processors are further configured to be capable of executing programmed instructions comprising and stored in the memory to:

create a second cryptographic key after a predetermined time period within the user session.

18. The device as set forth in claim 13 wherein the at least one of the configurable logic is further configured to implement or the one or more processors are further configured to be capable of executing programmed instructions comprising and stored in the memory to:

the at least one part of the at least one cryptographic key from the client computing device and other parts of the at least one cryptographic key from one or more other locations.

19. The method of claim 1, wherein the session state is based on a hash of the at least one cryptographic key.

20. The medium of claim 7, wherein the session state is based on a hash of the at least one cryptographic key.

21. The device of claim 13, wherein the session state is based on a hash of the at least one cryptographic key.

* * * * *